J. C. COLLETT & N. T. LAUSE.
MECHANISM FOR STUFFING PADS.
APPLICATION FILED APR. 29, 1910.
981,615.
Patented Jan. 17, 1911.
3 SHEETS—SHEET 2.
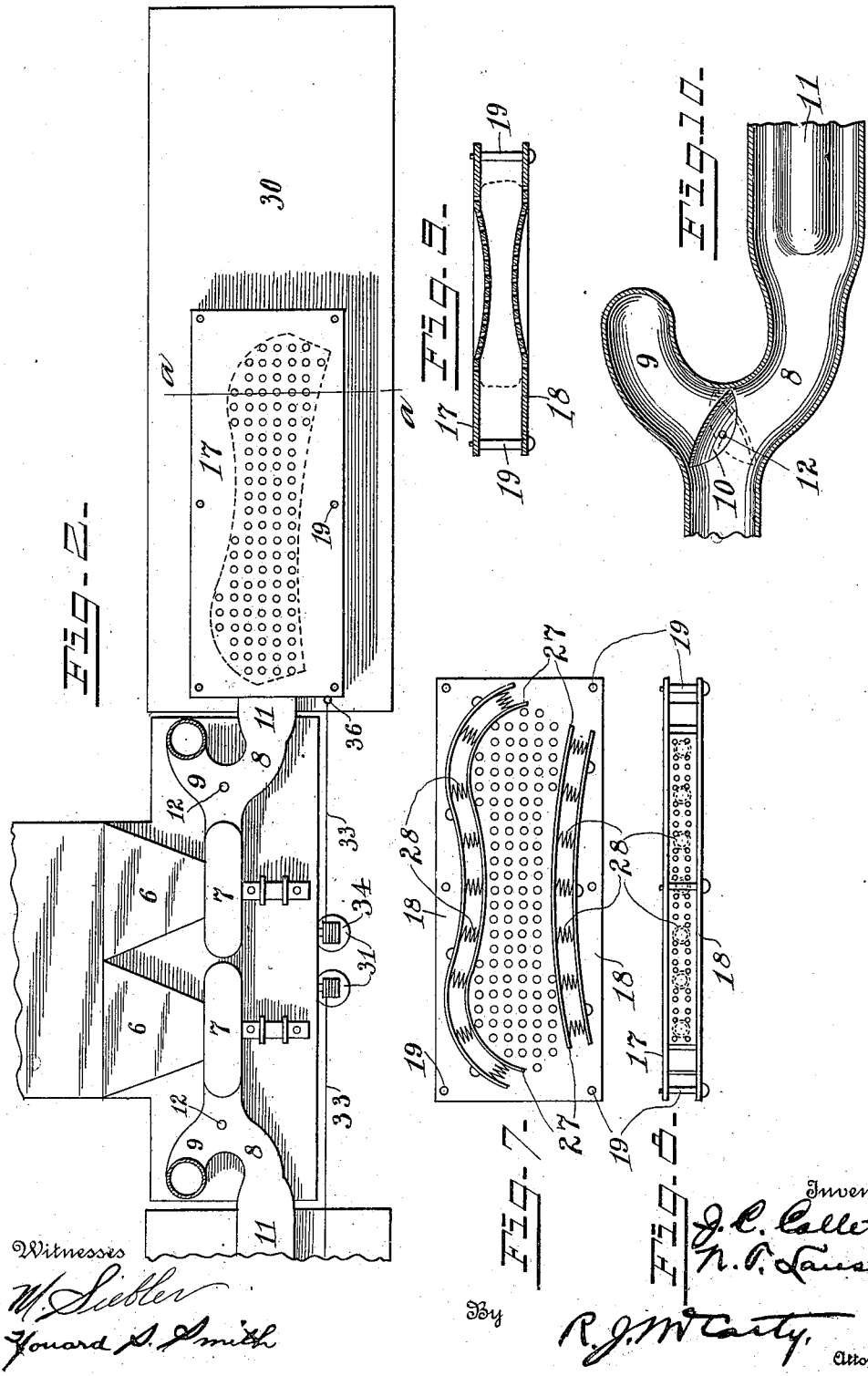

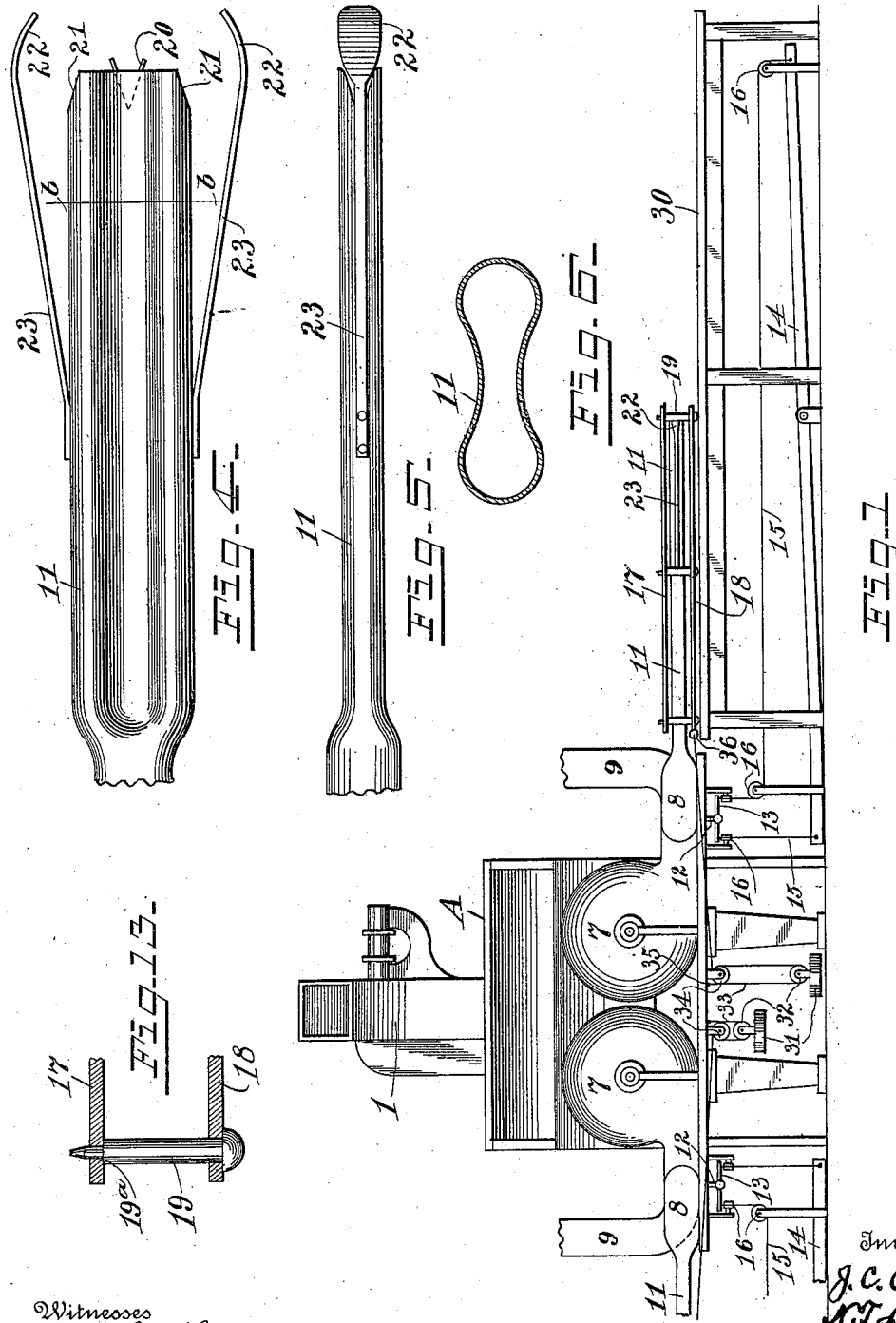

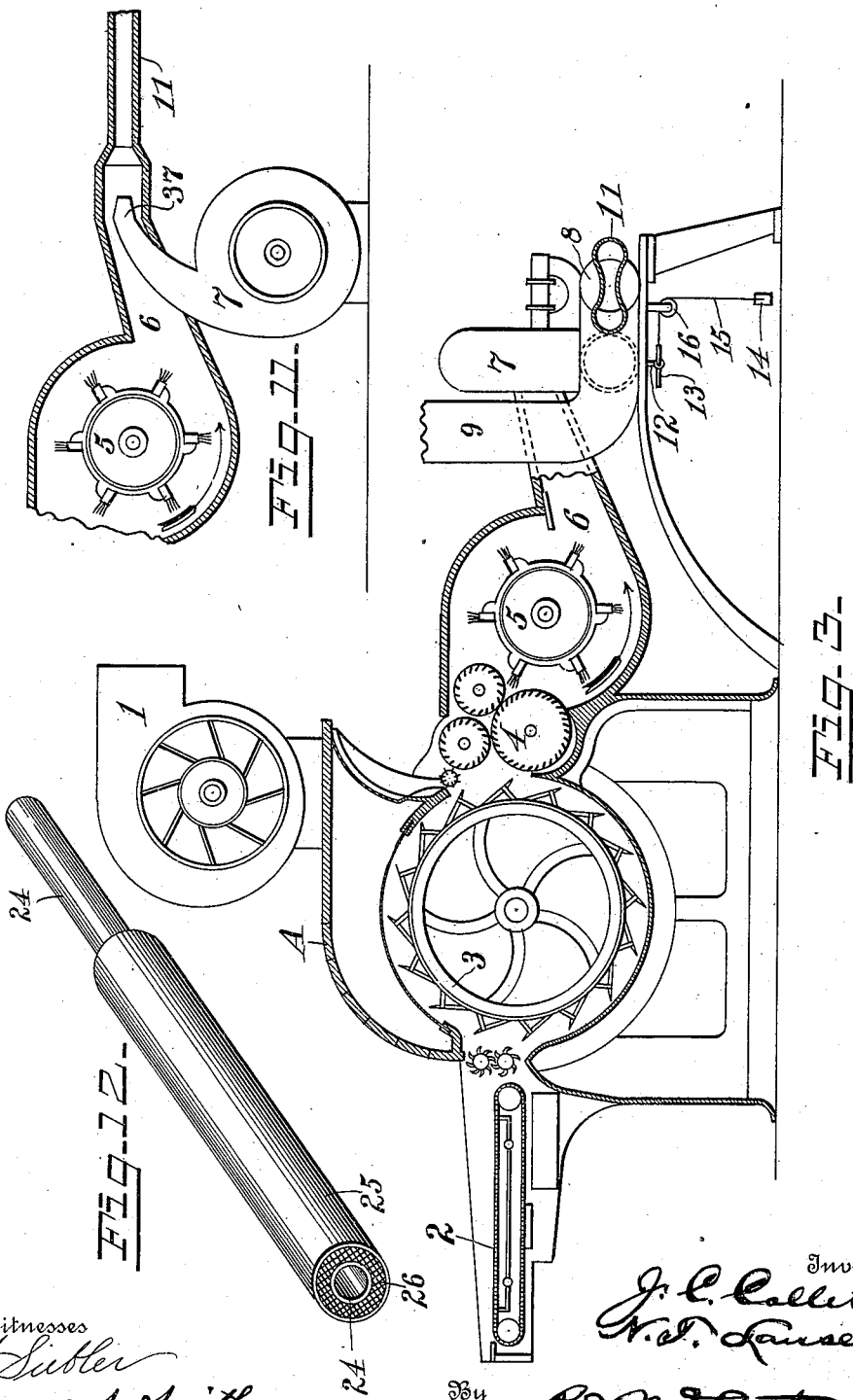

UNITED STATES PATENT OFFICE.

JOHN C. COLLETT AND NICHOLAS T. LAUSE, OF DAYTON, OHIO, ASSIGNORS TO THE FOGELSONG MACHINE COMPANY, OF DAYTON, OHIO, A CORPORATION.

MECHANISM FOR STUFFING PADS.

981,615.  Specification of Letters Patent.  Patented Jan. 17, 1911.

Application filed April 29, 1910. Serial No. 558,476.

*To all whom it may concern:*

Be it known that we, JOHN C. COLLETT and NICHOLAS T. LAUSE, citizens of the United States, residing at Dayton, in the county of Montgomery and State of Ohio, have invented certain new and useful Improvements in Mechanism for Stuffing Pads; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in machines for stuffing or filling harness sweat pads or the like.

The object of the invention is to provide means for evenly and uniformly stuffing the filling material into the casing and for expeditiously performing the work. In carrying out the invention air is used as a means for driving the filling material into the casing.

A further object of the invention is to provide the sweat pads with straight or square edges, which insures a uniform thickness throughout, and a further object is to construct the delivery end of the feed chute so that the air leaving it will spread laterally and thus engage the entire body of the filling material within the casing.

In the drawings, Figure 1 is a front elevation of a machine having the invention incorporated therein. Fig. 2 is a top plan view of the same. Fig. 3 is a side elevation of the same, the picker being shown in section. Fig. 4 is a top plan view of the stuffing chute. Fig. 5 is a side elevation of the same. Fig. 6 is a section on the line *b—b* of Fig. 4. Fig. 7 is a plan view of one type of former. Fig. 8 is a side elevation of the same. Fig 9 is a section on the line *a—a* of Fig. 2. Fig. 10 is a detail view of the valve. Fig. 11 is a modification showing a different method of applying the current of air. Fig. 12 is a modified form of stuffing chute; and Fig. 13 is a detail view of the supporting or separating pins used in the formers.

Throughout the specification and drawings similar reference characters indicate corresponding parts.

In the drawings A represents a picker of any well known type. As shown in the drawings it is provided with a blower 1 which is adapted to carry off the dirt and any other foreign substance that may be in the hair or other filling material. The hair or filling material is fed into the picker by an endless belt 2; and while passing through said picker it is acted upon by a picker cylinder 3, bur cylinder 4 and a brush 5, which throws the hair into passage-ways 6. The hair, after passing through the machine, is free from lumps and dirt and in a proper condition to be stuffed into the form of a pad. From the passage-ways 6 the hair is drawn into right and left fans 7 which are provided with outlets 8 and 9 controlled by a valve 10. The outlet 8 is provided with a stuffing chute 11 which enters the pad to be stuffed; the outlet 9 leads to the storage bin (not shown) for the hair or stuffing material. The valve 10 is shown in detail in Fig. 10. It is provided with a rock shaft 12 having a cross arm 13 connected to a treadle 14 by means of cables 15 which pass over pulleys 16. The arrangement is such that when the left end of the treadle 14, shown in Fig. 1, is depressed, the valve 10 will open the outlet 8 to the stuffing chute 11, and when the right end of the treadle is depressed the valve will close the outlet to the stuffing chute and open the outlet 9 to the storage bin. It will be understood that each fan 7 is adapted to serve a stuffing chute 11, which are identical with the exception that they are right and left. Only the right stuffing chute is illustrated in the drawings.

The casing to be stuffed or padded is of a suitable textile fabric and is stretched over the stuffing chute 11 and the current of air, carrying the hair from the fan 7, is directed into the chute 11 by the valve 10. To hold the casing in proper shape, a former is provided as follows. Referring to Figs. 2 and 9, 17 and 18 designate upper and lower members which are suitably shaped to conform to the desired shape of the pad. The members 17 and 18 are separated by pins 19, shown in detail in Fig. 13, and the upper member 17 rests upon shoulders 19$^a$, thereby allowing the upper member 17 to be easily removed to permit the insertion of the pad casing. In stuffing a casing it is desirable that the edges be full and square; and to secure this form the stuffing chute 11 is constructed as follows. As shown in Fig. 6, the said chute is shaped in cross section somewhat like the figure eight. This shape throws the hair to the outer edges of the pad; and to further increase this effect, a deflecting guide 20 is placed in the end of the chute 11, and the corners of said chute are cut away as at 21, Fig. 4. To obtain the desired square edges of the pad, as is shown in dotted lines in Fig. 9, there is mounted on each side of the chute 11, spoons 22 which are controlled by springs 23. These spoons 22 press outwardly and hold the pad casing in shape while the hair is being blown or stuffed into the pad. The air finds egress through the meshes of the cloth of the pad casing, and the members 17 and 18 are perforated to allow the air to escape. However, if the pad casing is made of material that does not allow the air to escape through the same, a stuffing chute of the type shown in Fig. 12 may be used. This tube or chute consists of an inner ingress tube 24 and an outer egress tube 25. The pad casing is stretched over the outer tube 25 and the air with the hair passes through the inner tube 24 and out through the outer tube 25. To prevent the hair passing out through the tube 25, a screen 26 is placed at the inlet thereof, as is shown.

In Figs. 7 and 8 is shown a modified type of pad former. In this type the square edges are obtained by yielding walls 27, and to conform to the slight difference in shape of the pads the walls 27 are mounted on springs 28. When this type of former is used, the spoons 22 may be dispensed with as the desired square edges are obtained by means of said walls 27. The formers are adapted to slide on a table 30 as the casing or pad is being stuffed, and to prevent the air blast moving the former faster than the pad is filled, a weight 31 is provided as shown in Fig. 1; the weight 31 is provided with a pulley 32 around which a cable 33 passes and also around a stationary pulley 34. One end of the cable 33 is secured at 35 and the other end is secured at 36 to the former. This arrangement allows the former to have a greater movement than the weight 31, which is desirable, as it forms a compact device.

In Fig. 11 is shown a modified form of air blast, in which the blower 7 is provided with a jet 37 which lies in the passage-way 6. A positive pressure blower may be substituted for the blower 7, thereby allowing a higher pressure of air to be used, which is desirable for some packing materials.

The operation is as follows: The operator removes the upper member 17 of the former and inserts a pad casing to be stuffed. The pad casing is then slipped over the stuffing chute 11 and the member 17 replaced. He then places his foot on the left end of the treadle 14 which shifts the valve 10 thereby directing the air with the hair, to the interior of the pad casing. As the casing is filled it is stripped off the chute 11. When it becomes entirely filled, the right end of the treadle 14 is depressed, thereby directing the air into the outlet 9 and thence to the storage bin. The stuffed pad is then removed from the former and the opening in the end of the pad is closed by other agencies. It will be seen that, instead of providing right and left fans 7, one large fan could be substituted which would act as a central station, and from which a distributing tube could extend to any part of the factory; and that the stuffing tubes 11 could project from the distributing tube as laterals.

Without limiting ourselves to the precise arrangement shown and described, we claim:

1. In a device of the type specified, the combination with a blower, of an outlet tube and a stuffing tube connected thereto, and means for directing the current of air from the blower to the outlet tube or to the stuffing tube, and a former adapted to contain a pad casing while said casing is receiving the stuffing material from the stuffing tube.

2. In a device of the character specified, the combination with a blower, of a pipe extending therefrom and terminating in a stuffing tube, and an outlet pipe leading to the storage bin for the stuffing material, a valve controlling the passage to the stuffing tube and outlet pipe, and a former adapted to contain a pad casing into which the stuffing tube is inserted.

3. In a device of the character specified, the combination with a blower, of a pipe extending therefrom and terminating in branches, one of which constitutes the stuffing tube and the other of which constitutes a return passage for the stuffing material, the opening in the delivery end of said stuffing tube being extended backwardly on opposite sides to direct the stuffing material laterally from the end of the tube, a valve controlling the direction of the stuffing material to the stuffing tube or to the return passage, and a pad former adapted to hold the pad casing while receiving the stuffing material from the stuffing tube, said former being constructed to impart a substantially uniform thickness to the pad, substantially as specified.

4. In a device of the character specified, the combination with a blower, of a pipe extending therefrom and terminating in branches one of which constitutes the stuffing tube and the other of which constitutes a return passage for the stuffing material, the opening in the delivery end of said stuffing tube being extended backwardly on opposite sides to direct the stuffing material laterally from the end of the tube, a valve controlling the direction of the stuffing material to the stuffing tube or to the return passage, a pad former adapted to hold the pad casing while receiving the stuffing material from the stuffing tube, said former being constructed to impart a flat edge to the circumference of the pad, and means controlling the movement of the former and pad as the stuffing material is fed to said pad.

5. In a device of the character specified, the combination with a blower, of a stuffing tube through which the stuffing material is blown, and spoons or spreading members attached to opposite sides of the stuffing tube and adapted to stretch the pad casing for the reception of the stuffing material from said tube.

In testimony whereof we affix our signatures, in presence of two witnesses.

JOHN C. COLLETT.
NICHOLAS T. LAUSE.

Witnesses:
    MATTHEW SEIBLES,
    R. J. McCARTY.